United States Patent Office 3,732,111
Patented May 8, 1973

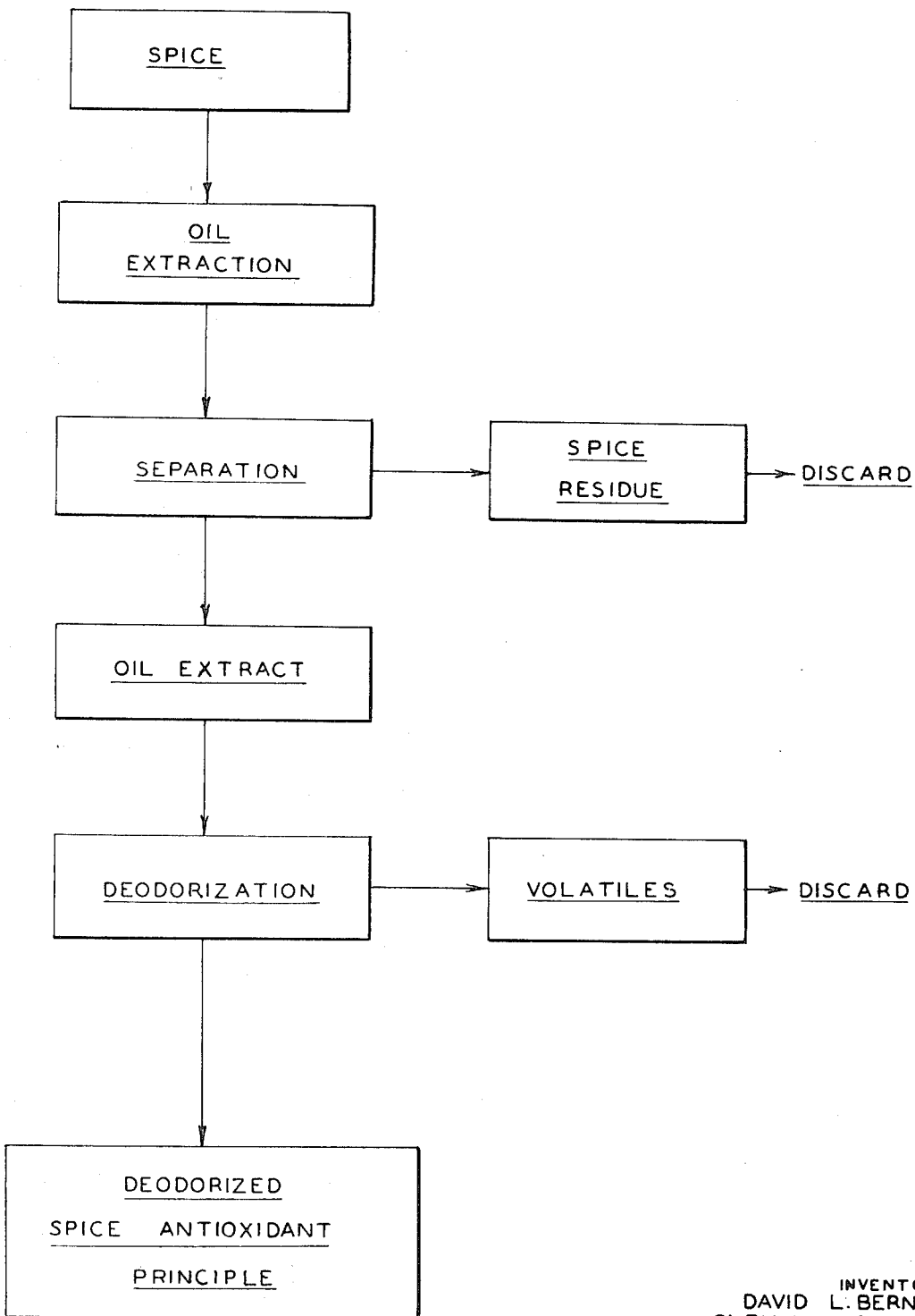

3,732,111
SPICE ANTIOXIDANT PRINCIPLE AND PROCESS FOR THE EXTRACTION THEREOF
David L. Berner and Glen A. Jacobson, Cherry Hill, and Charles D. Trombold, Cinnaminson, N.J., assignors to Campbell Soup Company, Camden, N.J.
Filed June 7, 1971, Ser. No. 150,638
Int. Cl. A23l 1/22; C07g 17/00
U.S. Cl. 99—140 R
10 Claims

ABSTRACT OF THE DISCLOSURE

Ground spice is extracted with heated animal or vegetable oil. The oil soluble extract containing volatile and non-volatile components is separated from the spice solids. The extract is heated under vacuum conditions and simultaneously sparged with steam to obtain a deodorized oil extract containing the oil soluble non-volatile spice antioxidant principle.

BACKGROUND OF THE INVENTION

This invention relates to a spice antioxidant principle and to a process for extracting the antioxidant principle from spices.

Spices are universally utilized to impart flavor and aroma enhancing qualities in both the preparation and consumption of comestible products. It has long been recognized that spices have other attributes when combined with various food products. For example, it is known that certain spices have antioxidant properties, whereby they extend to stability of certain foods and prevent fat oxidation in certain meats and meat products.

Spices are generally dried plant products which have distinctive aroma and flavor characteristics. A majority of spices are grown and harvested in tropical countries and imported in whole form into the United States. In harvesting a spice crop, little or no effort is made to remove the insects that are normally associated with the spice; accordingly, it is not unusual to find that spice lots are adulterated with insects and insect fragments when they are imported into this country. Other impurities and adulterants may also be found in the imported spices. While spice processors exercise care in handling and storing spices, it is not unusual to find that the spices are further contaminated in storage. It is extremely difficult to remove impurities and adulteration from spice products, especially such impurities as insect fragments and animal hairs which find their way into the spices as the result of the usual rodent population found on ships and in warehouses. Consequently, when the food processor utilizes spices in the production of his products, he runs the risk of incorporating adulterated or impure agents into his product.

Consider, for instance, a manufacture of processed meat products, such as sausage, luncheon, meats, etc., products which traditionally have high spice contents. Such a manufacturer has in the past incorporated spices essentially in the form they are imported into this country, save for comminution to acceptable ground size, into his product to enhance the flavor and aroma thereof. Recognizing that the moist meat product is a fertile media for the growth and multiplication of dormat bacteria and spores found in the spices, elaborate and costly procedures have been developed for sterilizing the spices prior to incorporation into meat products. Despite these procedures, certain contaminants such as animal hairs and insect fragments are not eliminated from the spices, and consequently it is possible to have an entire batch of a food product rendered unsalable due to the presence of even minute quantities of contaminant.

Another approach has been to extract spice principles such as those responsible for flavor, aroma, and antioxidant characteristics of the spice and incorporate the extracts into the product being prepared. Typical extraction procedures are disclosed in U.S. Pats. 2,571,867; 2,571,948; and 3,071,475. Extraction procedures generally provide a product free of contaminants. However, due to the complex nature of the spice components responsible for such characteristics as flavor and aroma, extraction procedures are usually complex and difficult to design so that they produce a uniform product each time the extraction procedure is utilized. Moreover, previous attempts to isolate the antioxidant principle from spices by various extraction procedures have not met with success.

When the food manufacturer desires to utilize spices for their antioxidant properties he is, of course, faced with the problems noted above. Synthetic antioxidants are available commercially; however, only those recognized as being safe for consumption by the Food and Drug Administration may be utilized. Additionally, synthetic antioxidants are volatile at relatively low temperatures, (circa 100° C.), thus, food processing above these temperatures results in a loss of the antioxidant activity.

Accordingly, it is an object of this invention to provide a process for extracting the antioxidant principle from spices. It is a further object of this invention to provide an extraction process which is reproducible, producing a space antioxidant principle which is uniform from lot to lot.

Another object of the invention is to prepare a spice antioxidant principle which is free of adulterants and impurities.

A still further object of this invention is to prepare a spice antioxidant principle which is substantially free of aroma and flavor characteristics.

A still further object of this invention is to prepare a spice antioxidant principle by a process which is simple and economical and recovers substantially the total antioxidant principle of the spice.

These and other objects and advantages are achieved as the result of the practice of the present invention.

DETAILED DESCRIPTION OF THE INVENTION

The appended drawing is a diagrammatic representation of the procedure utilized to extract the antioxidant principle from spices.

As utilized in this specification and the appended claims, the term "antioxidant principle" refers to that material obtained by treating spices as described herein. The exact chemical composition of the antioxidant principle extracted from spices cannot be determined or identified at this time; in fact, the spice antioxidant principle may be one or a mixture of more than one complex chemical compounds; accordingly, identification other than by the term "antioxidant principle" is not possible.

In accordance with this invention, the antioxidant principle is obtained from a spice by extracting the spice with an edible animal or vegetable oil at a temperature sufficient to extract the oil soluble volatile and non-volatile components from the spice; separating the oil extract containing the oil soluble volatile and non-volatile spice components from the spent spice solids; deodorizing the oil extract containing the oil soluble volatile and non-volatile spice components by heating the extract under vacuum conditions while simultaneously sparging with steam, the quantity of heat, vacuum and steam being sufficient to drive off the volatile spice components and recovering the non-volatile, oil soluble deodorized spice antioxidant principle.

The present process is adaptable for extracting the antioxidant principle from any spice; however, it is particularly useful in extracting the antioxidant principle from those spices especially noted for their antioxidant activity. Members of the Labiatae family, such as sage, rosemary, basil, peppermint, spearmint, and blends of these spices may be utilized to provide the desired spice antioxidant principle. The antioxidant principle extracted from these spices has been found to exhibit greater antioxidant activity in comparison with an equivalent amount of the dry spice.

While whole spice may be utilized in the present process, it is preferred that the spice or mixture of spices should be coarsely ground to air extraction of the antioxidant principle. Whole spice may be ground in any conventional manner, preferably to a relatively coarse particle size, typically on the order of about 20 to about 60 mesh (Tyler Series). Initial subdivision of the whole spice may be accomplished in a roller grinder or other conventional equipment. In addition to spices, per se, residues obtained from processes in which volatile components, such as flavor principles, have been extracted from spices, may be utilized in this process.

The antioxidant principle is extracted from the spice with an edible animal or vegetable oil. The phrase "edible animal or vegetable oil," as used herein, includes both solid and liquid oils. Thus, the oil selected for extraction may be a liquid vegetable oil such as cottonseed oil or peanut oil or it may be a solid animal oil such as beef or mutton tallow. Hydrogenated or saturated oils may also be utilized. The preferred oils are cottonseed oil and peanut oil. Certain vegetable oils such as soy bean oil are less desirable than cottonseed and peanut oil because the inherent undesirable flavor characteristics of the oil may become associated with the extracted antioxidant principle. The ground spice is combined with the oil in a proportion of from about 5 to about 25%, preferably from about 15 to about 20%, by weight, based on the weight of the oil, for the extraction process.

Extraction is accomplished by heating the oil-spice mixture to a temperature sufficient to extract the oil soluble volatile and non-volatile components from the spice. It has been found that the oil soluble spice components are extracted most efficiently when the oil is heated to a temperature of from about 80° to about 180° C., preferably from about 120° to about 125° C. during the extraction step. In practice, it is preferred to heat the vegetable oil prior to the addition of the ground spice.

The extraction takes place in from about one-half to about three hours, preferably about two hours, with continuous agitation of the oil-spice mixture; however, the agitation should not cause aeration of the oil. The extraction operation may be accomplished in any convenient manner, one practical method being simply adding the oil to an open container, heating it, adding the ground spice and maintaining the oil-spice mixture at the desired temperature.

The extraction parameters, i.e. particle size of the spice, temperature of the oil during extraction, time of the extraction procedure and agitation of the oil-spice mixture are, as will be recognized by the art, interrelated, with no one parameter or combination of parameters being critical for successful extraction of the spice antioxidant principle. Thus, while the antioxidant principle may be extracted from finely ground spice with high temperatures in a short period of time or in somewhat longer periods with lower temperatures, coarsely ground spices will require longer extraction periods even with high extraction temperatures to effect complete extraction of the antioxidant principle.

Following the oil extraction, the extract containing the oil soluble volatile and non-volatile spice components is separated from the spent spice solids. Separation may be accomplished by any suitable means, one convenient means involving centrifuging the mixture followed by isolation of the oil phase from the spent spice solids. Any fine spice particles found in the isolated oil which were not removed by the centrifugal separation may be easily removed from the oil by filtration.

While not a necessary feature of this invention, if the oil etxract has a color at this point in the extraction process which would be undesirable in utilization of the spice antioxidant principle, the oil extract can be easily decolorized by passing it through a bed of any well-known decolorizer or by forming a slurry of the oil and solid decolorizer and separating the oil from the decolorizer.

After separating the oil extract from the spent spice solids, the oil extract is deodorized to recover the desired spice antioxidant principle. The goal of the deodorization step is to remove the more volatile spice components from the less volatile spice components of the oil extract. Deodorization involves three interrelated parameters, temperature, vacuum and steam sparging. By the proper combination of these three factors, the more volatile spice components, including any unwanted flavor and aroma characteristics extracted by the oil, are removed from the oil extract producing a deodorized, bland oil extract.

Deodorization is accomplished by heating the oil extract under vacuum conditions while simultaneously sparging with steam. Those in the art can readily appreciate that these three factors are interrelated and that precise temperature, vacuum and sparging conditions are not critical, the only requirement being that the combination of these factors be sufficient to drive off those unwanted volatile components from the oil extract leaving a bland, virtually flavor-free, deodorized spice antioxidant principle. In the deodorization step, heating temperature and vacuum conditions go hand-in-hand; higher temperatures requiring less vacuum and vice-versa to remove the unwanted volatile components. Steam sparging is essentially utilized to effect more efficient removal of the unwanted voatile material. Another factor bearing in the quantity of heat, vacuum and steam sparging utilized in the deodorization step is the degree of blandness desired in the antioxidant principle. That is, if it is desired to obtain a virtually flavor-free antioxidant principle (e.g. a completely bland product) it will be appreciated that the deodorization process will have to be more complete, completeness depending upon the amount of heat, vacuum and steam utilized in the process, while if a product having some flavor characteristics is desirable or acceptable, the deodorization step need not be carried out to the extent required for the flavor-free product. Thus, for example, in the final deodorization step, the oil extract may be heated to a temperature of from about 120° to about 220° C., preferably from about 175° to about 185° C., for a relatively short period of time (e.g. from about 10 minutes to about 1 hour, preferably about 30 minutes) under a vacuum of from 1 to 25 mm., preferably 2 to 4 mm., mercury. Steam sparging involves simply the passage of steam through the heated oil extract. The amount of steam utilized in sparging depends on the amount of oil extract being treated as well as on the size and shape of the container utilized in the deodorization step. The oil extract remaining after deodorization contains the desired spice antioxidant principle.

The extraction procedure outlined above removes about 85% of the antioxidant principle from the treated spices, the extracts having greater antioxidant activity as compared with an equivalent amount of dry spice. Furthermore, the antioxidant principle is recovered from the spice essentially free of adulterants and impurities and the process permits recovery of the antioxidant principle in a form which is uniform from lot to lot.

The oil extract of the spice antioxidant principle can be added to food products in a wide range of amounts to provide antioxidant activity. For example, about ½%, by weight, of the spice antioxidant principle provides antioxidant activity in candy, while about 1½%, and 5%, by weight, of the spice antioxidant principle based on the weight of the raw materials is required to provide antioxidant activity in sausage and chicken batter, respectively. Since the spice antioxidant principle is recovered from the spice in a deodorized and essentially flavor-free condition, it may be utilized in many products without influencing the flavor or aroma thereof. If desired, flavor extracts may be added to the spice antioxidant principle when both flavoring and antioxidant activity are desired.

The following examples are included for the purpose of illustration.

EXAMPLE 1

Two hundred and twenty-five g. of cottonseed oil is heated in an open container to about 125° C. Forty-five g. of sage (20 to 60 mesh) is added to the oil and the mixture is continuously agitated without significant aeration of the oil for a period of three hours while maintaining the mixture at 125° C. The mixture is transferred to a centrifuge, and the oil extract phase is separated from the spent spice solids. The oil extract is filtered to remove fine space particles, transferred to a closed deodorized vessed and heated to 175° C. with steam sparging for ½ hour under 2 to 4 mm. mercury. One hundred eighty g. of oil, having a bland taste and little or no aroma is recovered.

Varying amounts of the spice antioxidant principle are added to pork fat and the treated pork fat is evaluated for the antioxidant activity of the added extract. Comparisons are made with a control sample containing no antioxidant principle and with pork fat containing synthetic antioxidants. The results are set forth in Table I.

TABLE I

[Active oxygen method (AOM) evaluations of antioxidant activity of deodorized cottonseed oil-sage antioxidant principle]

| Percent antioxidant principle in pork fat | AOM time,[1] min. | Antioxidant index[2] |
|---|---|---|
| Control (no antioxidant) | 20 | 1.0 |
| 1.25% extract | 480 | 24.0 |
| 2.50% extract | 1,050 | 32.5 |
| 3.75% extract | 1,290 | 64.5 |
| 5.00% extract | 1,110 | 55.5 |
| 7.50% extract | 1,620 | 81.0 |
| 0.05% mixture[3] | 1,725 | 86.3 |
| 0.02% BHA (butylated hydroxyanisole) | 570 | 28.4 |
| 0.02% PG (propyl gallate) | 940 | 47.0 |

[1] Time to reach a peroxide value (PV) of 20 at 110° C. and 2.33 cc. air per sec.

[2] Antioxidant index = $\dfrac{\text{Sample time required to reach PV 20}}{\text{Control time required to reach PV 20}}$

[3] The mixture consisted of 20% BHA, 6% propyl gallate, 4% citric acid, and 70% propylene glycol.

A further test is conducted to compare the flavor of pork sausage patties containing either the spice antioxidant principle of this invention or a commercially available synthetic antioxidant. The results of this test are set forth in Table II.

TABLE II

[Flavor panel evaluation of cooked pork sausage patties containing 5% deodorized cottonseed oil-sage antioxidant principle]

| | Flavor scores[1] | |
|---|---|---|
| | Control[2] | 5% extract |
| Age,[3] months: | | |
| 1 | 6.25 | [4] 7.58 |
| 2 | 6.79 | [5] 7.58 |
| 3 | 5.92 | 6.87 |

[1] Each score is the average of scores of six different trained panel members. For scoring, a scale of 2 to 10 was used where 2=very poor, 4=poor, 6=fair, 8=good, and 10=excellent.

[2] Control contained at a level of 0.05% of the fat, a mixture consisting of 20% BHA (butylated hydroxyanisole), 6% propyl gallate, 4% citric acid, and 70% propylene glycol.

[3] While aging, the pork patties were stored in a frozen state (−20° C.) under oxygen.

[4] Statistically significant at 95% level.

[5] Statistically significant at 90%.

Having thus defined the invention, what is claimed is:

1. A process for extracting the antioxidant principle from a spice which comprises:
   (a) grinding the spice to be extracted into small particles;
   (b) extracting the oil soluble volatile and non-volatile components from this spice with an edible animal or vegetable oil by combining the ground spice and the oil and heating the resulting combination to a temperature of approximately 80 to 180° C., for a period of approximately ½ to 3 hours;
   (c) separating the oil extract containing oil soluble volatile and non-volatile spice components from the spice solids, and
   (d) removing the oil soluble volatile components of the spice from the oil extract containing oil soluble volatile and non-volatile spice components by heating the extract under vacuum conditions to a temperature of approximately 120 to 220° C. for a period of approximately 10 to 60 minutes and simultaneously therewith sparging the oil extract with steam to obtain a deodorized oil extract containing the oil soluble non-volatile space antioxidant principle.

2. The process according to claim 1 wherein the spice is selected from the group consisting of sage, rosemary, basil or mixtures of these spices.

3. The process according to claim 2 wherein the ground spice has a particle size of about 20 to about 60 mesh.

4. The process according to claim 3 wherein the spice is sage.

5. The process according to claim 1 wherein the edible animal or vegetable oil is selected from the group consisting of cottonseed oil or peanut oil.

6. The process of claim 1 wherein the spice is combined with the edible animal or vegetable oil in a proportion of from about 5 to about 25%, by weight, based on the weight of the oil.

7. The process of claim 6 wherein the spice is combined with the edible animal or vegetable oil in a proportion of from about 15 to about 20%, by weight, based on the weight of the oil.

8. The process of claim 7 wherein the extraction is carried out at a temperature of from about 120° to about 125° C.

9. The process of claim 1 wherein the deodorization is carried out at a temperature of from about 175° to about 185° C. under a vacuum of from about 2 to about 4 mm. of mercury.

10. A spice antioxidant principle produced in accordance with claim 1.

References Cited

UNITED STATES PATENTS

| | | | |
|---|---|---|---|
| 2,571,867 | 10/1951 | Hall et al. | 99—140 R |
| 3,542,653 | 11/1970 | Lowrey et al. | 99—118 R |
| 2,571,948 | 10/1951 | Sair et al. | 99—140 R |
| 2,752,314 | 6/1956 | Clopton | 99—163 |
| 3,071,475 | 1/1963 | Stohr | 99—118 R |
| 2,124,706 | 7/1938 | Maveety | 99—163 |

OTHER REFERENCES

Crocker, Flavor, 1945, pp. 59–63.

MORRIS O. WOLK, Primary Examiner

S. B. DAVIS, Assistant Examiner

U.S. Cl. X.R.

99—22, 118 R, 150 R, DIG 1; 252—398; 260—236.5